United States Patent [19]

Markovitz

[11] 4,095,856
[45] Jun. 20, 1978

[54] ADJUSTABLE BOTTOM STEP BEARING

[75] Inventor: Richard E. Markovitz, Cincinnati, Ohio

[73] Assignee: Brighton Corporation, Cincinnati, Ohio

[21] Appl. No.: 761,719

[22] Filed: Jan. 24, 1977

[51] Int. Cl.² .............................................. F16C 23/10
[52] U.S. Cl. .................................. 308/29; 23/252 R; 82/33 A; 308/62; 308/72
[58] Field of Search ........................ 308/72, 62, 29, 31, 308/32; 82/33 A; 23/252, 285

[56] References Cited

U.S. PATENT DOCUMENTS

| 717,924 | 1/1903 | Reid | 308/62 |
| 1,143,203 | 6/1915 | Kennedy | 308/62 |
| 1,838,582 | 12/1931 | Skillman | 308/29 |

Primary Examiner—Trygve M. Blix
Assistant Examiner—Reinhard J. Eisenzopf
Attorney, Agent, or Firm—J. Warren Kinney, Jr.

[57] ABSTRACT

An externally accessible bottom step bearing for the lower end of an elongate, top supported, vertically mounted rotatable shaft of an elongate vessel is provided with spherical means which compensate for angular misalignment and with eccentric means which accommodate off-center alignment of the shaft with respect to the centerline of the vessel.

25 Claims, 4 Drawing Figures

BALL 62 ALLOWS FOR ANGULAR MISALIGNMENT OF SHAFT DUE TO ANGULAR MISALIGNMENT OF NOZZLE WITH CENTERLINE OF VESSEL

DOUBLE ECCENTRICS 72 AND 74 ALLOW FOR DISPLACEMENT OF CENTERLINE OF SHAFT WITH REGARD TO CENTERLINE OF VESSEL

ADJUSTABLE BOTTOM STEP BEARING

BACKGROUND OF THE INVENTION

1. Field of the Invention

The invention relates to shaft bearings, and in particular to a bearing for the lower end of a rotatable, vertically suspended shaft, wherein the bearing includes means to not only compensate for angular misalignment, but also to accommodate off-center alignment of the shaft relative to the centerline of a vessel in which the shaft is housed.

2. Description of the Prior Art

For many years the chemical industry has used elongate, vertical, processing vessels of the type having elongate, rotatable impeller shafts which extend throughout the entire length of the vessels. The impeller shafts are rotatably suspended and driven from the top or upper end of the vessels, and since the height of the vessels are often fifty feet or more, with a diameter of seven or more feet, the technique of providing a long lasting bearing support for the lower end of the impeller shafts has left much to be desired, and has presented a serious problem for the industry.

Heretofore it has been the practice to lower an impeller shaft into a vessel in order that a workman, who has entered the bottom of the vessel beneath the lower end of the shaft via a porthole in the side of the vessel, will have access to the lower end of the shaft in order to fit a bearing onto the lower end thereof. A tripod bearing support was associated with the bearing, after which the shaft was hand rotated in order that the workman could observe the path described by the shaft end relative to the centerline of the vessel, after which he would mark that position of the bearing which would provide the least amount of shaft distortion incident to rotation thereof. The legs of the tripod bearing support were then tacked to the inner surface of the bottom head of the vessel, after which the shaft would be lifted to disengage the bearing until the legs of the bearing support were securely anchored in place, by means of welding. The shaft was then lowered for disposing its lower end in the bearing.

By reason of the long length of impeller shafts it is and was difficult, if not impossible, to rotatably suspend them from their upper ends in such a manner as to locate them in parallelism with the center line of their vessels, with the result that angular misalignment of shafts relative to the centerline of their respective vessels was inevitable. Any such angular misalignment results in the lower end of the shaft being rotated off-center with respect to the centerline of a vessel, which produces a situation in which such excessive wear occurs on the bottom bearings, as to shorten their useful life to a period of from three to six weeks.

Whenever it became desirable or necessary for the bottom bearing to be inspected or replaced, the vessel would be emptied, and if the contents thereof were toxic or otherwise harmful, sticky or dangerous, the interior of the vessel would be purged, after which a workman would enter the bottom of the vessel via a side manhole to obtain access to the bearing. If the bearing required replacement, the shaft would be raised, the old bearing removed from the tripod support and replaced with a new bearing, after which the shaft end was guided into the new bearing by the workman who would then crawl out of the manhole, which when closed permitted the vessel to be recharged and again put in operation.

In certain instances access to the bottom bearings was possible only by lowering a workman into a vessel, after the impeller shaft was completely withdrawn in order that the bearing could be inspected and/or replaced.

I am aware of the use of double eccentrics as means for adjusting the center line of a shaft relative to a bearing support in those instances in which there is axial alignment of a shaft with respect to the bearing; however, the more use of double eccentrics as a means for accommodating displacement of the lower end of an impeller shaft with respect to the centerline of a vessel will not solve the problem created by angular misalignment of the shaft relative to the said centerline.

I am aware of the following patents which disclose the use of double eccentrics for the purpose of adjusting the center line of the shaft relative to a support member viz: U.S. Pat. Nos. 1,571,557 to W. L. Paul; 2,711,935 to W. H. Miles; 2,826,462 to L. B. Evans; 2,860,015 to P. D. Matterson; 2,920,497 to R. Wilken; 3,453,031 to S. S. Rickley et al; and 3,467,450 to H. K. Schmidt et al.

SUMMARY OF THE INVENTION

The lower end of the impeller shaft of an elongate, vertical vessel is accessible exteriorly of the vessel through an opening in the bottom wall or head of the vessel, and an adjustable bottom step bearing for the lower end of the shaft is securely, though adjustably and releasably, mounted within said opening. The manner in which the bearing is mounted permits it to be installed, inspected, removed and replaced from a location beneath the external of the lower end of the vessel.

The bearing comprises a spherical member which is interposed between the shaft end and the innermost of a pair of eccentricly disposed, adjustable, bearing rings to compensate for any angular misalignment of the shaft relative to the centerline of the vessel. The eccentrically disposed bearing rings are adapted to accommodate off-center alignment of the shaft with respect to the centerline of the vessel.

The unique marriage of a spherical member, as aforesaid, with the eccentric rings provides a bearing structure which is characterized by a useful life which is at least 500% greater than the life of the bearings presently used in the lower ends of the impeller shafts of elongate, vertically disposed vessels.

DESCRIPTION OF THE PREFERRED EMBODIMENT

Figure 1:
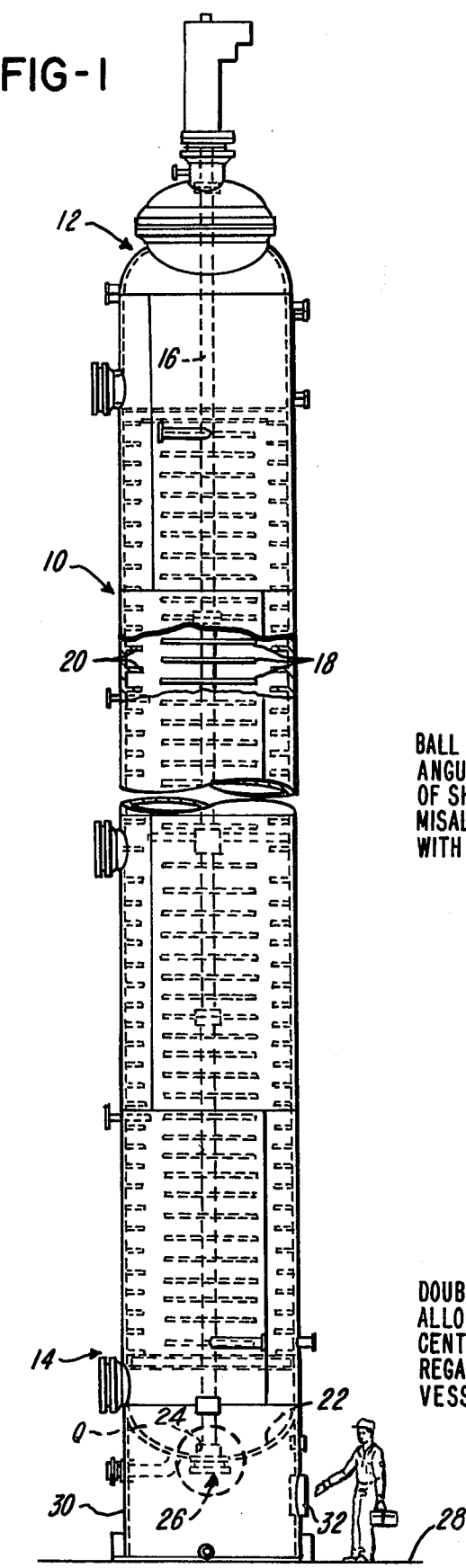
FIG. 1 is a plan view of a typical, elongate, vertical vessel, of the type which includes an elongate impeller shaft which is rotatably suspended from its upper end, the lower end of said shaft, as indicated within the circle, terminating in an adjustable step bearing which embodies the teaching of the present invention.
Figure 4:
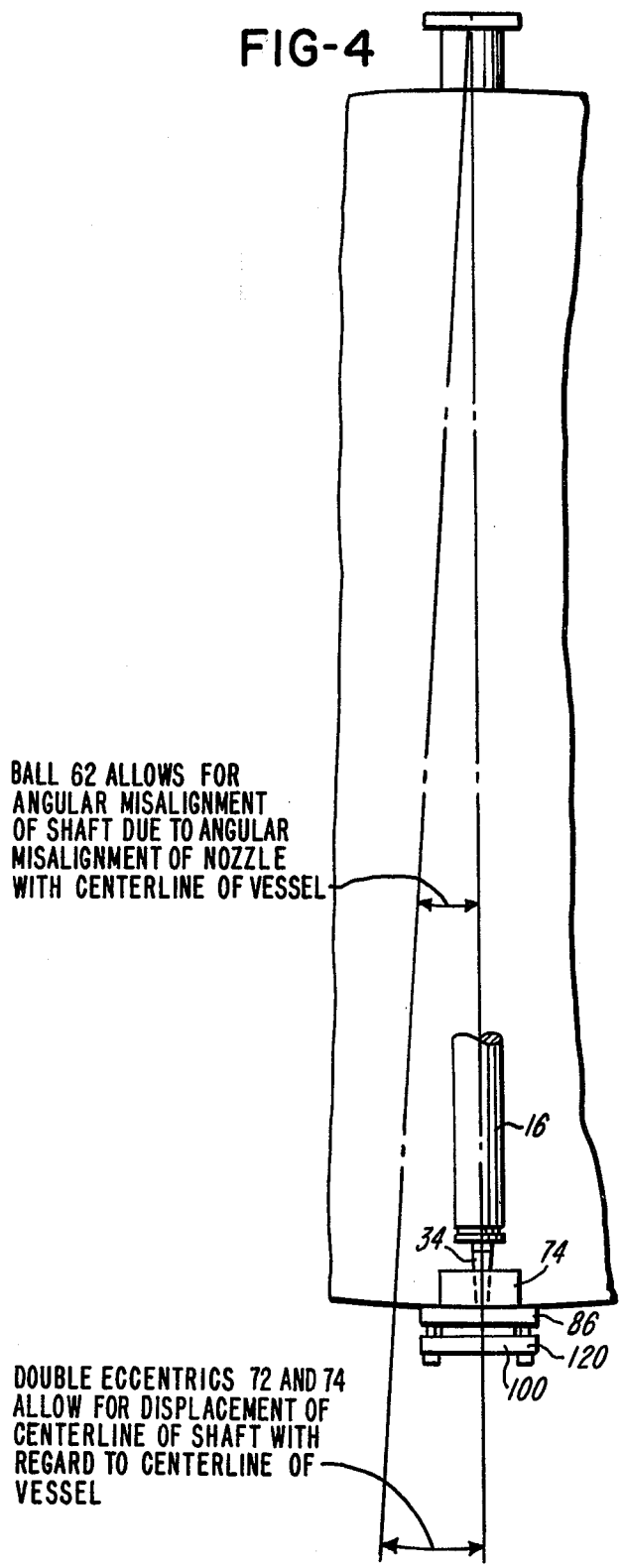
FIG. 4 is a diagrammatic view of the impeller shaft, a portion of the vessel, and the adjustable bottom step bearing of FIG. 1 which illustrates the overall double function of the adjustable bottom step bearing of the present invention.

With particular reference to FIG. 1, the numeral 10 denotes generally an elongate vessel having an upper end 12 and a lower end 14. An elongate impeller shaft 16 is rotatably suspended from its upper end interiorly of the vessel, said shaft being provided with a plurality of horizontally extending impellers 18 which in certain instances are disposed in predetermined relationship with respect to a plurality of vertically spaced, horizontally or inwardly projecting vessel-supported vanes 20. The lower end 14 of the vessel is defined by a bottom head 22 having an opening 24 (see FIG. 1) for the reception of the adjustable bottom-step bearing 26 within the encircled area of FIG. 1.

The bottom head 22 is disposed above a supporting surface 28, such as, by way of example, the floor of a building or the like, by means of a depending housing 30 which has an access opening or porthole 31 for enabling a workman to enter into the space immediately beneath bottom head 22, for the purpose of installing, inspecting, adjusting and/or replacing the replaceable bushing of the bottom bearing assembly.

The present invention is neither directed to nor concerned with the particular or specific structural details of vessel 10, impellers 18, vanes 20, and/or the means by which shaft 16 is supported from its upper end and rotated within the vessel. It should, however, be noted that the rotatable means by or from which the shaft is suspended, is known in the art as a nozzle.

Figure 2:
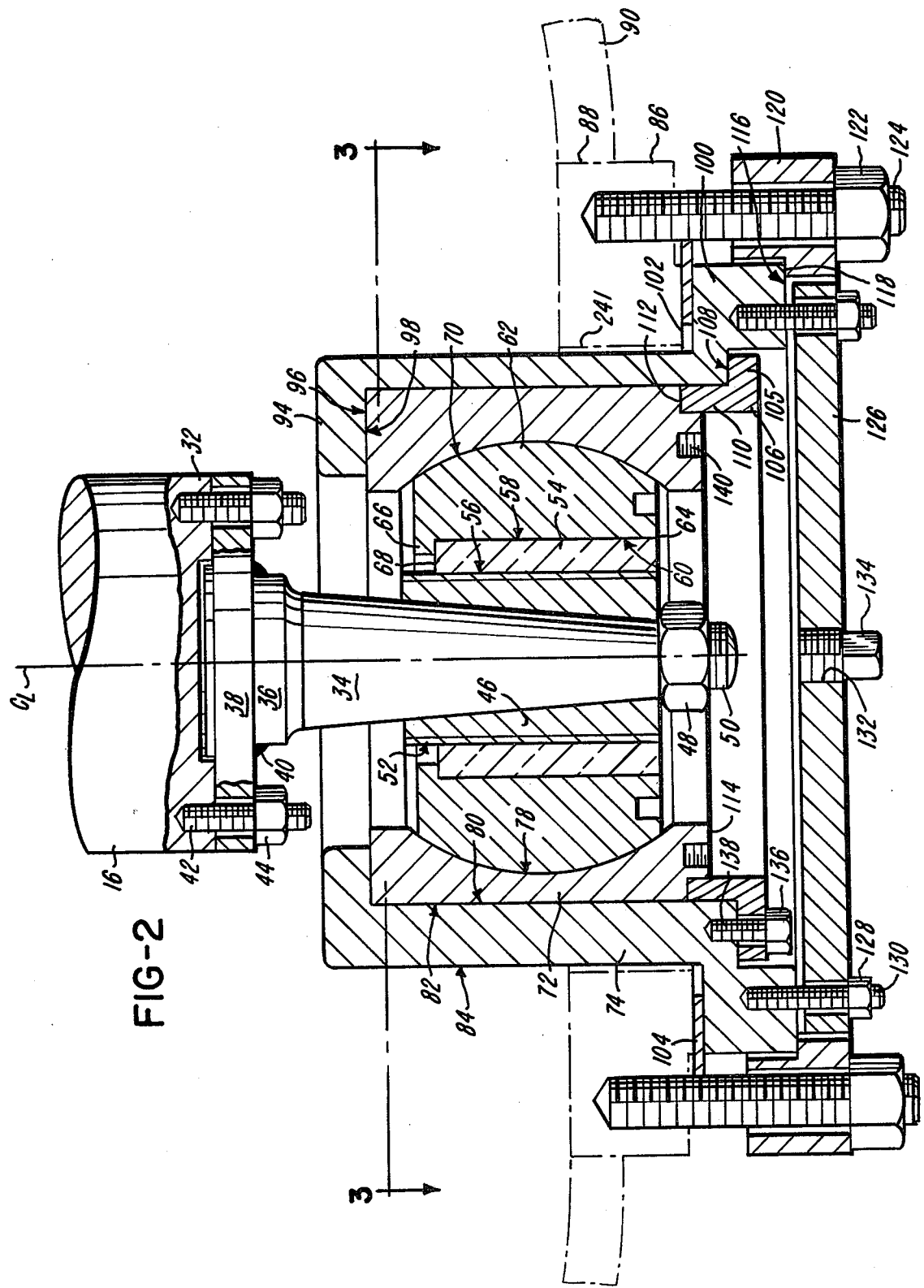
FIG. 2 is an enlarged view, partly in section of the lower end of the impeller shaft and adjustable bottom step bearing within the encircled portion of FIG. 1.
Figure 3:
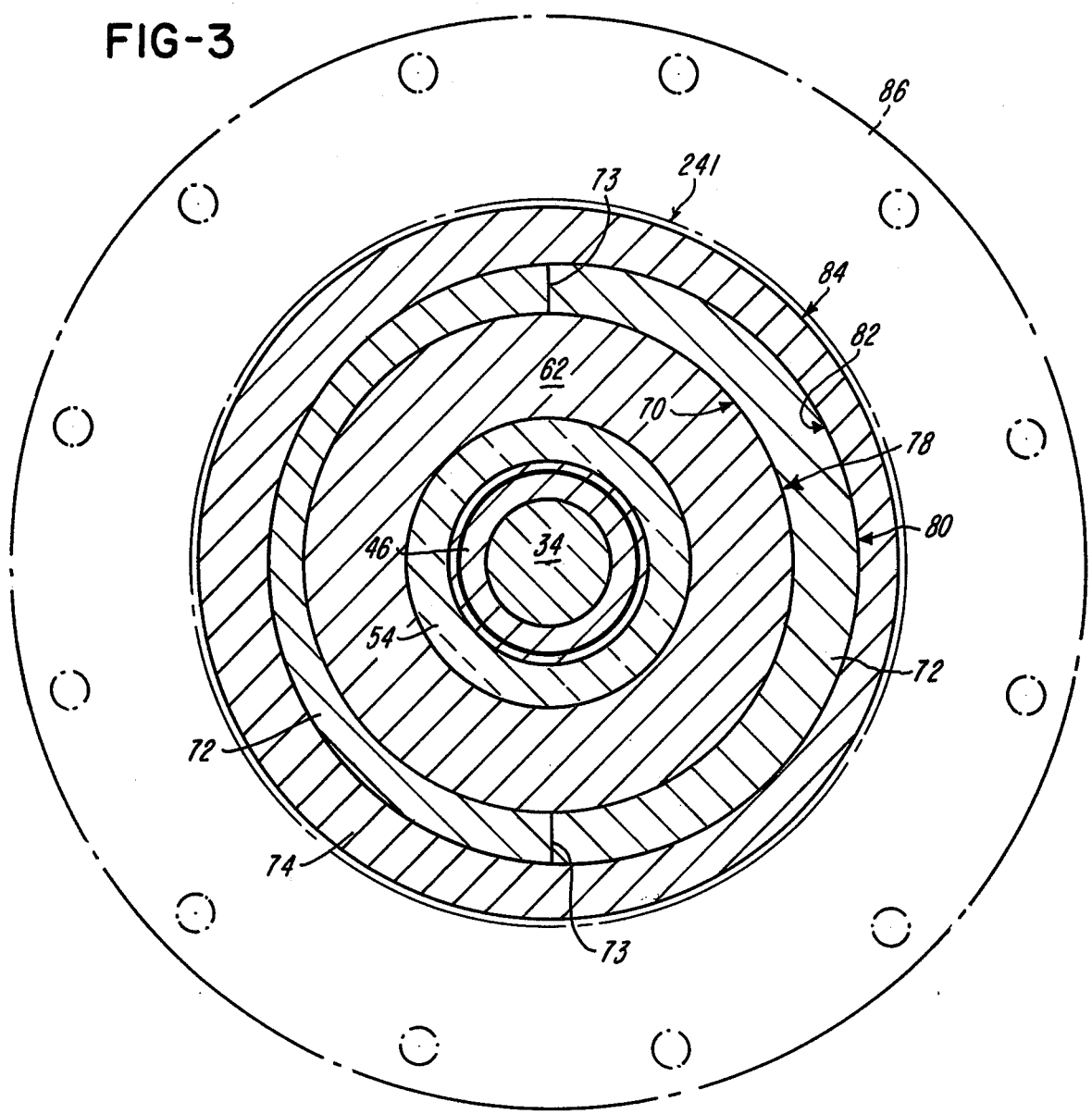
FIG. 3 is a sectional view taken on line 3—3 of FIG. 2.

The invention is directed to the structural details and relationship of the adjustable bottom step bearing as illustrated in FIGS. 2 and 3.

Referring now to FIG. 2, it will be noted that the lower end 32 of shaft 16 is provided with a tapered extension 34, the upper end 36 of which is fixedly secured to a mounting plate 38, by means of weld, or the like, 40. Mounting plate 38 is in turn securely though releaseably affixed to the lower end of shaft 16 by means of studs 42 which threadably engage tapped holes in the lower end of shaft 16 and nuts 44, which engage the studs as illustrated.

The center line CL of the tapered extension 34 is in precise axial alignment with the center line of shaft 16.

In the preferred embodiment of the invention, a bearing sleeve 46, having a tapered opening therethrough which is the compliment of the taper of extension 34, is securely though releasably anchored to the lower end of the extension by means of a nut 48 which engages the threaded end 50 of extension 34.

The outer surface 52 of sleeve 46 is concentric with respect to the center line of extension 34, and said surface being suitably hardened to provide a wear-resistant, hard, bearing surface to sleeve 46.

An elongate, cylindrical, replaceable bushing 54 fabricated, by way of example, from Teflon and glass and characterized by its low coefficient of friction and its excellent wear-resistant properties has an inner surface 56 which is adapted to slideably receive the outer hardened surface 52 of the bearing sleeve 46.

The outer surface 58 of replaceable bushing 54 is received within the bushing-receptive socket 60 of an intermediate member 62. Said bushing receptive socket is open at its lower end 64, whereas its upper end includes an inwardly projecting flange or lip 66, which is engaged by and determines the position of the upper end 68 of the replaceable bushing 54.

The outer surface 70 of member 62 defines or comprises the surface of a portion of a true sphere.

The numerals 72 and 74 denote, generally, inner and outer eccentric rings, wherein the inner ring is diametrically slit as at 73 (see FIG. 3). The inner surface 78 of the inner eccentric ring 72 is concentric with respect to the center line of the intermediate member 62, and is the compliment of the outer surface 70 thereof. This unique relationship permits the axis of the replaceable bushing to coincide with the centerline CL of shaft 16 and its tapered extension 34, for all amounts of angular misalignment between the axis of said shaft with respect to the centerline of the vessel.

In FIG. 2 no angular misalignment has been illustrated between the axis CL of shaft 16 and the centerline of the vessel of FIG. 1, however, it should be understood that if, by way of example, the centerline CL were to be inclined 5° to the right, the bearing sleeve 46, bushing 54 and intermediate member 62 would all be inclined by a like amount relative to the inner surface 78 of the inner eccentric ring 72.

The outer surface 80 of the inner eccentric ring 72 is eccentric with respect to its inner surface 78, as clearly illustrated in FIG. 3.

The inner surface 82 of the outer eccentric ring 74 is eccentric with respect to the outer surface 70, of the intermediate member 62, whereas its outer surface 84 is concentric with respect thereto.

In the preferred embodiment of the invention, a bottom step bearing pad 86 is provided in an opening 88 in the bottom head 90 of the elongate vessel, said bearing pad having an axial opening 24 therethrough for the reception of the outer surface 84 of the outer eccentric ring 74.

As clearly illustrated in FIG. 2, the upper end of the outer eccentric ring 74 terminates in an in-turned flange 94, the lower surface 96 of which is adapted to be engaged by the upper end 98 of the inner eccentric ring 72. The lower end of the outer eccentric ring 74 is provided with an outwardly and downwardly projecting mounting member 100, a portion of which is adapted to extend outwardly under lower surface 102 of the bottom step bearing pad 86, wherein the adjacent surfaces of mounting member 100 and lower surface 102 of the bottom step bearing pad 86 are sealed by a gasket or pad 104.

The horizontal leg 105 of an L-shaped gland 106 is adapted to extend outwardly beneath the lower, circumferential surface 108 of the outer eccentric ring 74, whereas vertical leg 110 is adapted to project upwardly into a leg-receptive channel 112 adjacent to the lower end 114 of the inner eccentric ring 72.

The lower surface 116 of the mounting member 100 is adapted to be engaged by the inwardly projecting surface 118 of a holding ring 120, said holding ring being securely though releasably anchored to the bottom step bearing pad 86 by means of nuts 122 which threadably engage studs 124 which are secured to, carried by and depend from bearing pad 86.

A blind cover plate 126 is adapted to be securely, though releasably, fastened to the lower mounting member 100 by means of nuts 128 engaging studs 130 which are secured to and project downwardly from said member. In the preferred embodiment of the invention, plate 126 is provided with one or more internally threaded openings 132 which are normally closed by plugs 134.

The lower leg 105 of the L-shaped gland 106 is adapted to be securely, though releasably, anchored relative to the inner and outer eccentric rings 72 and 74 by means of bolts 136, the shanks of which are recieved within suitably internally threaded bores 138 located in the lower surface of the outer eccentric ring 74.

From the foregoing it will be noted that the spherical surface 70 of intermediate member 62, will permit any angular misalignment of the lower end of shaft 16 to be compensated for in such a manner that the outer surface 70 of the intermediate member 62 will provide the desired angular adjustment or relationship with the complimentary inner surface 78 of the inner eccentric ring 72, thereby effectively accommodating any angular misalignment of the shaft by reason of angular misalignment of the nozzle or means by which the impeller shaft is rotatably suspended from the upper end of the vessel, with respect to the center line thereof.

With particular reference to FIG. 2, it will be noted that the relationship between the centerline of extension 34 of shaft 16 and spherical surface 70 of spherical member 62 is such that any angular misalignment of said centerline with respect to the centerline of the vessel 10 results in spherical surface 70 being shifted relative to the complimentary surface 78 of the inner eccentric ring 72 without disturbing the relationship of the inner and outer eccentric rings.

It will be noted that the lower end of shaft 16 and its extension 34 is easily accessible via opening 24. The bearing sleeve 46 may be secured to extension 34 before shaft 16 is lowered into the vessel, or said sleeve may be easily attached thereto after the shaft has been lowered to the position illustrated.

The replacable bushing 54 is press fit into the bushing receptive socket 60 of intermediate member 62, after which the two halves of the inner eccentric ring 72 are closed onto and around outer surface 70 of the intermediate member 62.

The bushing 54, intermediate member 62, and inner eccentric ring halves thus assembled are adapted to be introduced upwardly onto bearing sleeve 46 and into the interior of the outer eccentric ring 74 which later ring has previously been secured relative to bearing pad 86 via holding ring 120.

Any angular misalignment of the shaft relative to the axis of the vessel will be automatically compensated for or accommodated by the spherical surface 70 of the intermediate member 62 and its relationship with the complimentary surface 78 of the inner eccentric ring 72.

Displacement of the centerline of the shaft relative to the centerline of the vessel may be compensated by turning the inner eccentric ring relative to the intermediate member 62 and the outer eccentric ring 74, via openings 140 which are adapted to receive the pins of a spanner wrench (not illustrated). After the eccentrics have been adjusted to have the lower end of the shaft rotate about a true center holding gland 106 is inserted and locked against the inner eccentric ring by means of bolts 136.

Thereafter cover plate 126 is secured in place for placing the impeller shaft in readiness for operation.

It is contemplated that the structural details of the subject bearing assembly are such as to provide several months satisfactory operation before it becomes necessary to replace bushing 54, it being noted that said bushing may be inspected, removed and replaced by an operator, outside of the vessel, working within the area immediately beneath bottom head 90.

When it becomes necessary or desirable to inspect or remove bushing 54 the following procedure is followed:

Plug 134 is removed from plate 126 whereby to permit the drainage of any fluid or other substance that may have accumulated on the plate. Thereafter, nuts 128 are removed to release plate 126 and expose the heads of bolts 136 which are loosened and then removed for enabling the holding ring 106 to be removed, after which the split-ring 72 can be withdrawn such as, by means of a jack screw which may be fastened to the lower end of the inner eccentric ring such as, by way of example, internal threads within the spanner-wrench holes 140. Withdrawal of the inner eccentric ring 72 will effect the simultaneous removal of the intermediate member 62 and bushing 54, thereby exposing the outer hardened surface 52 of the bearing sleeve 56 for visual or other inspection.

Bushing 54 is thereafter removed from the interior of ball 62, being replaced by a new bushing, after which the new bushing, intermediate member 62, and inner eccentric ring halves 72 are advanced upwardly onto bearing sleeve 46 to again assume the relative positions illustrated in FIG. 2.

From the foregoing, it will be noted that I have provided simple yet effective and efficient means to compensate for angular misalignment of a rotatable shaft with respect to the bearing in which an end of the shaft is journaled.

The presence of the spherical surface 70 of intermediate member 62 between bushing 54 and the inner surface of the inner eccentric ring 72 of the bearing assembly not only permits, but freely accommodates any tilting of the bushing as the result of angular misalignment of shaft 16 relative to vertical centerline of the bearing-support rings 72 and 74 which are anchored to or relative to a fixed bearing support, viz the bottom wall of vessel 10.

It should be understood that the centerlines of inner and outer eccentric rings 72 and 74 are, at all times, disposed in parallelism with the centerline of vessel 10, and at right angles with the plane of the bottom bearing pad 86 in bottom 90 of the vessel.

Heretofore angular misalignment of a shaft, such as 16, would produce an undesirable condition in the bearing in which the shaft end was journaled, because the misalignment was transmitted directly to that position of the bearing in which the bushing was received or mounted, unless the entire bearing assembly was anchored in a tilted condition for angularly misaligning the centerline of the bearing to correspond with the misalignment of the shaft. In those instances in which a bearing was mounted in a tilted position to accommodate the angular misalignment of the shaft which was rotatably suspended from its upper end, the degree of angular misalignment of the shaft relative to the centerline of the vessel could, and often would change each time the shaft would be withdrawn from the vessel for one reason or another. The bearing assembly would, therefore, have to be removed from its initially anchored (welded) position interiorly of the bottom of the vessel and re-anchored to accommodate the new angular misalignment of the shaft.

However the general practice heretofore followed was to mount or anchor the lower bearing interiorly of the bottom of the vessel without regard to the angular misalignment of the shaft, that is, with the centerline of the bearing in parallelism with the centerline of the vessel. Then, when the lower end of the angularly misaligned shaft was journaled in the lower bearing that portion of the shaft intermediate its upper and lower ends would curve or bend due to the inherent flexibility of the shaft because of its length. Rotation of the curved or bent shaft resulted in the imposition of non-uniform radial impulses to the shaft end which impulses, or whipping action was imparted directly to the bushing and other portions of the bearing, with the result that the life and effectiveness of the bearing, and in particular the bushing thereof was quite short, in the neighborhood of from 3 to 6 weeks. As noted earlier, the aforesaid problem caused by angular misalignment of the elongate shaft of an elongate vessel has plagued the chemical industry for at least a quarter of a century.

The subject invention solves the problem since it automatically compensates for any amount or degree of angular misalignment of a shaft relative to its end bearing.

It should be understood that the eccentric rings 72 and 74 which allow for correction of displacement of the centerline of the shaft with respect to the centerline of said rings, which centerline is in parallelism with the centerline of the vessel, will not accommodate, correct or compensate for angular misalignment of the shaft.

The subject invention, insofar as it relates to means for compensating for angular misalignment of a shaft with respect to the centerline of a bearing, contemplates a construction wherein the eccentric rings such as 72 and 74 may be replaced with an outer bearing housing which is adapted to be anchored to a fixed bearing-support surface, wherein the said outer bearing housing includes an inner surface which is the complement of spherical surface 70.

The invention further contemplates that in certain instances intermediate member 62 would be fabricated from a suitable bushing material, in which event separate bushing 54 would be omitted.

To summarize, if intermediate member 62, or an equivalent thereof be omitted, angular misalignment of shaft 16, extension 34, bearing sleeve 46 and bushing 54 would impart a whipping action to the inner eccentric ring 72, in which event, with member 62 omitted, the inner surface of the inner eccentric ring would be cylindrical to accommodate the outer cylindrical surface 58 of bushing 54, and the resultant relationship will produce stresses in the bushing of such a nature and magnitude, as to shorten its effective and useful life to a matter of from 3 to 6 weeks.

By utilizing the intermediate member 62 all of the angular misalignment is compensated for in such a manner that the life of bushing 54 has been greatly increased to a useful life of six months or more, and whenever it is necessary or desirable to inspect, remove and/or replace the bushing, access thereto is readily available, via plate 126 from the outside of the vessel via the bearing-receptive opening 24 in the bottom head of the vessel.

What is claimed is:

1. A bearing for the lower end of an elongate shaft which is rotatably suspended from its upper end, the bearing having a longitudinal centerline and comprising:

a bearing sleeve concentrically connected to the shaft lower end to be rotatable therewith;

a replaceable bushing receiving said bearing sleeve;

an intermediate member having a bushing receiving means defined therein which receives said bushing therein so that the inner surface of said intermediate member is concentric with said bushing, said intermediate member having an arcuate outer surface;

an inner eccentric ring surrounding said intermediate member and having an arcuate inner surface shaped to correspond to and to receive said intermediate member outer surface in a manner which permits said intermediate member to move with respect to said inner ring for compensating for tilting of the shaft with respect to a vertical orientation thereof; and shaft displacement compensating means which compensates for misalignment of the shaft with respect to the bearing longitudinal centerline, said displacement compensating means including an outer eccentric ring surrounding said inner eccentric ring.

2. A bearing as called for in claim 1, wherein said intermediate member includes a substantially spherical outer surface, and wherein the said outer eccentric ring includes an inner surface which is the complement of the outer spherical surface of the said intermediate member.

3. A bearing as called for in claim 2, which includes means for securely though releasably anchoring the outer eccentric ring to a fixed bearing support.

4. A bearing as called for in claim 2, wherein the lower end of the elongate shaft is provided with an axially aligned, downwardly projecting tapered extension; a bearing sleeve secured to and carried by said extension for rotation with the shaft, said sleeve having an inner tapered surface which is the complement of the taper of the extension and an outer surface which is substantially cylindrical; a replacable bushing interposed between the outer surface of said bearing sleeve and an inner surface of said first mentioned means, whereby angular misalignment of the shaft produces a like amount of angular displacement of the spherical outer surface of said first mentioned means with the inner surface of the inner eccentric ring.

5. A bearing as called for in claim 4, wherein the outer surface of the said bearing sleeve is hardened to resist wear, whereby wear between the bearing sleeve and replaceable bushing is localized in the bushing.

6. A bearing as called for in claim 4, wherein the inner eccentric ring is selectively rotatable relative to the outer surface of the said first mentioned means and the inner surface of the outer eccentric ring for shifting the said first mentioned means in a plane normal to a fixed bearing support to compensate for off-center alignment of the lower end of the shaft with respect to the centerline of said support.

7. A bearing as called for in claim 2, wherein said bushing is interposed between the rotatable shaft and the inner surface of the said intermediate member whereby angular misalignment of the shaft produces an angular displacement of the spherical outer surface of the intermediate member with respect to the complementary inner surface of the inner eccentric ring.

8. A bearing as called for in claim 7, wherein the intermediate member has a substantially cylindrical inner surface dimensioned to snugly receive the outer surface of said bushing, the upper end of said cylindrical surface terminating in an abutment which engages the upper end of said bushing.

9. A bearing as called for in claim 8, wherein the said bushing includes an axial bore dimensioned to receive the bearing sleeve.

10. A bearing as called for in claim 7, wherein the bushing is securely though releasably carried by said intermediate member, and wherein the inner eccentric ring is rotatably adjustable relative to the intermediate member and the outer eccentric ring, and means for locking the inner ring in adjusted position.

11. A bearing as called for in claim 10, wherein the outer eccentric ring includes an outer surface which is concentric with respect to the centerline of the shaft, and an inner surface which is eccentric with respect thereto, and wherein the inner eccentric ring includes an outer surface which is eccentric with respect to the said centerline, and an inner surface which is concentric with the centerline and the complement of the spherical outer surface of the intermediate member.

12. A bearing as called for in claim 11, wherein the outer surface of the inner eccentric ring, and the inner and outer surfaces of the outer eccentric ring are disposed in parallelism and at right angles with a fixed bearing support to which the outer ring is anchored.

13. A bearing as called for in claim 12, wherein the upper end of the inner surface of the outer eccentric ring terminates in an abutment which is engaged by an upper end of the inner eccentric ring, and wherein the lower end of said inner surface terminates in an outturned ledge, an L-shaped gland in engagement with said ledge and the lower end of the inner eccentric ring, and means engaging the lower ledge of the outer eccentric ring for advancing said gland against the inner eccentric ring to lock the inner ring relative to the outer ring.

14. A bearing as called for in claim 12, wherein the fixed bearing support comprises the bottom wall of an elongate vessel in which the shaft is rotatably mounted.

15. A bearing as called for in claim 14, wherein the bottom wall of the vessel is provided with an opening dimensioned to loosely receive the outer surface of the outer eccentric ring the lower end of which terminates in an outwardly projecting abutment which engages the lower surface of the bottom wall of the vessel adjacent the opening therethrough, and means securely though releasably anchoring said abutment to said bottom wall.

16. A bearing as called for in claim 15, wherein the means for anchoring the abutment of the outer eccentric ring to the vessel bottom comprises a holding ring which circumferentially engages the edge-adjacent lower surface of the said outwardly projecting abutment, said holding ring being releasably secured to said vessel bottom.

17. A bearing as called for in claim 15, wherein the inner eccentric ring, the intermediate member and the bushing are removable as a unit from both the outer eccentric ring and from a bearing sleeve which is secured to and rotatable with the lower end of the elongate shaft.

18. A bearing as called for in claim 17, which includes means for securely though releasably locking the inner eccentric ring in adjusted relationship with respect to said first mentioned means and the outer eccentric ring.

19. A bearing as called for in claim 18, wherein the said locking means is accessible from the outside of the vessel via the opening in the bottom wall thereof.

20. A bearing as called for in claim 19, wherein access to said locking means and the bearing is normally prevented by means of a cover plate which is secured to and carried by the lower surface of the said outwardly projecting abutment of the outer eccentric ring.

21. A method of compensating for misalignment between the end of a shaft which is rotatably suspended and a bearing in which the shaft is journaled, the method comprising the steps of:
  mounting a bearing sleeve on the shaft lower end so that said bearing sleeve is rotatable with the shaft;
  slidably positioning said bearing sleeve within a replacement bushing;
  surrounding said bushing with an intermediate member;
  providing said intermediate member with an arcuate outer surface;
  surrounding said intermediate member with an inner eccentric ring;
  providing said inner eccentric ring with an arcuate inner surface shaped to correspond to said intermediate member outer surface;
  positioning said intermediate member within said inner eccentric ring in a manner which permits said intermediate member to move with respect to said inner eccentric ring so that tilting of the shaft with respect to a vertical orientation is compensated for by movement of said intermediate member within said inner ring;
  surrounding said inner eccentric ring with an outer eccentric ring; and
  positioning said inner eccentric ring within said outer eccentric ring in a manner which permits said eccentric rings to be moved with respect to each other about the shaft so that displacement of the shaft with respect to a longitudinal centerline of the bearing is permitted.

22. A method as called for in claim 21 which includes the additional steps of:
  Securing said bushing relative to the end of a rotatable shaft;
  Mounting said bushing-receptive portion of the bearing relative to a fixed support member.

23. A method of compensating for angular misalignment of the lower end of an elongate shaft which is rotatably suspended from its upper end from the upper portion of an elongate vessel in which the shaft is mounted, and of compensating for off-center misalignment of the lower end of the shaft with respect to the centerline of the vessel, comprising the steps of:
  (a) Positioning a bearing sleeve between the lower end of the shaft and a replaceable bushing so that the bearing sleeve is rotatable within the shaft within the replaceable bushing;
  (b) Positioning an intermediate member between the replaceable bushing and the inner one of a pair of inner and outer eccentric rings;
  (c) Providing the inner surface of said intermediate member with a bushing-receptive socket and the outer surface with a spherical contour;
  (d) Providing a socket in the inner surface of the inner eccentric ring shaped for reception of the spherical contour of said intermediate member;
  (e) Dividing said inner ring into two parts along a diameter thereof for enabling each part to be mounted onto the spherical outer surface of the intermediate member;
  (f) Introducing said two parts of the inner eccentric ring, while in place on the intermediate member, into the interior of the outer eccentric ring for maintaining said parts in embracing relationship and movable with respect to the outer surface of the intermediate member to accommodate tilting of the shaft with respect to a vertical orientation thereof; and (g) adjusting said eccentric rings about the shaft and with respect to each other to compensate for off-center misalignment of the end of the shaft with respect to the centerline of the vessel.

24. A bearing for the lower end of an elongate shaft which is rotatably suspended from its upper end, the bearing having a longitudinal centerline and comprising:

a bearing sleeve concentrically connected to the shaft lower end to be rotatable therewith;

a replaceable bushing receiving said bearing sleeve;

an intermediate member having a bushing receiving means defined therein which receives said bushing therein so that the inner surface of said intermediate member is concentric with said bushing, said intermediate member having an arcuate outer surface;

a first ring surrounding said intermediate member and having an arcuate inner surface shaped to correspond to and to receive said intermediate member outer surface in a manner which permits said intermediate member to move with respect to said inner ring for compensating for tilting of the shaft with respect to a vertical orientation thereof; and shaft displacement compensating means in the bearing which compensates for misalignment of the shaft with respect to the bearing longitudinal centerline.

25. A bearing for the lower end of an elongate shaft which is rotatably suspended from its upper end, the bearing having a longitudinal centerline and comprising:

a bearing sleeve concentrically connected to the shaft lower end to be rotatable therewith;

a replaceable bushing slidably receiving said bearing sleeve;

an intermediate member having a bushing receptive socket defined therein so that said bushing is received within said intermediate member in a manner such that the inner surface of said intermediate member is concentric with said bushing, said intermediate member having an arcuate outer surface;

a first ring surrounding said intermediate member and having an arcuate inner surface shaped to correspond to said intermediate member outer surface, said intermediate member outer surface slidably engaging said first ring inner surface and said first ring inner surface having an angular extent in excess of the angular extent of said intermediate member outer surface so that said intermediate member can move with respect to said first ring to compensate for tilting of an elongate shaft with respect to a vertical orientation of such elongate shaft; and shaft displacement compensating means in the bearing which compensates for misalignment of the shaft with respect to the bearing longitudinal centerline.

* * * * *